United States Patent Office 3,106,087
Patented Oct. 8, 1963

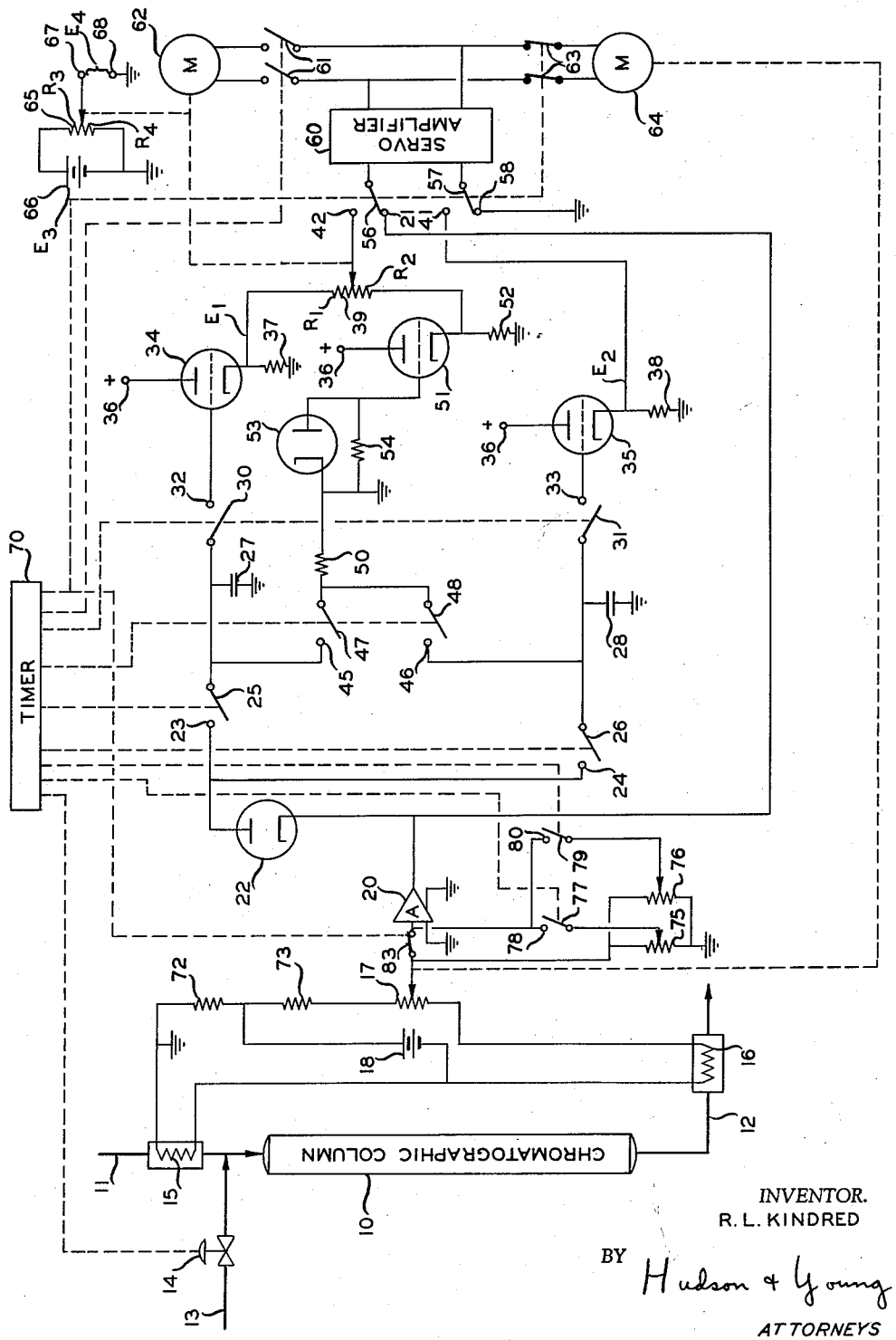

3,106,087
FLUID STREAM ANALYZER
Raymond L. Kindred, Bartlesville, Okla., assignor to Phillips Petroleum Company, a corporation of Delaware
Filed May 23, 1960, Ser. No. 31,044
3 Claims. (Cl. 73—23)

This invention relates to the analysis of fluid streams to determine the ratio of selected constituents therein.

Various types of automatic control schemes for chemical processes have been developed in recent years. In many of these schemes, a sample of a fluid mixture in the process is withdrawn and analyzed to determine a property thereof. A control step is then performed in response to this analysis to regulate a process variable to maintain the measured property at a preselected value. In some types of chemical processes, it is desirable to maintain a predetermined ratio between the concentrations of two constituents fed to a reactor or other processing zone. One such example occurs in the production of sulfur in a two step process which comprises oxidizing hydrogen sulfide to produce sulfur dioxide and then reacting the sulfur dioxide with additional hydrogen sulfide to produce sulfur. It is important that the ratio of sulfur dioxide to hydrogen sulfide be maintained constant in the feed to the second reactor in order to produce the maximum amount of sulfur. Another example of such a need to measure ratios occurs in the alkylation of paraffins with olefins in the production of gasoline. It is desirable that the ratio of these two constituents fed to the alkylation zone be maintained constant at a preselected value. Still another example occurs in the production of ammonia. A measurement of the ratio of hydrogen to nitrogen in the feed to an ammonia synthesis reactor can be employed to control the air to a gas reforming converter which produces hydrogen from natural gas.

In accordance with the present invention, apparatus is provided for analyzing a fluid mixture and for establishing a signal which is representative of the ratio of two constituents of the fluid mixture. The fluid sample is introduced into an analyzer which establishes a series of output signals representative of individual constituents of the fluid mixture. Chromatographic analyzers and mass spectrometers (when employed to analyze non-interfering components) are representative of such analysis instruments. The output signals from such an analyzer are applied in sequence through a peak reading device to respective first and second signal storage means. The signals applied to the storage means are combined with one another so as to establish an output signal that is representative of the ratio of the two stored signals. This output signal can be employed to advantage for control purposes wherever it is desired to maintain the ratio of the two constituents in the fluid mixture at a preselected value. Apparatus is also provided in accordance with this invention for zeroing the analyzer circuit periodically.

Accordingly, it is an object of this invention to provide apparatus for analyzing fluid samples to measure the ratio between selected constituents thereof.

Another object is to provide apparatus for establishing an electrical signal which is representative of the ratio of the peak magnitudes of two signals which are received in sequence.

Other objects, advantages and features of this invention should become apparent from the following detailed description, taken in conjunction with the accompanying drawing which is a schematic representation of an embodiment of the invention.

Referring now to the drawing in detail, there is shown a chromatographic column 10. This column is filled with a suitable packing material which selectively retards the passage therethrough of the individual constituents of a fluid mixture to be analyzed. A carrier gas is introduced into the inlet of column 10 through a conduit 11 and is exhausted through a conduit 12. A conduit 13, having a control valve 14 therein, also communicates with the inlet of column 10. A first temperature sensitive resistance element 15 is disposed in conduit 11, and a second temperature sensitive resistance element 16 is disposed in conduit 12. First terminals of these resistance elements are connected to one another and to the first terminal of a current source 18. Resistors 72 and 73 and a potentiometer are connected between the second terminals of resistance elements 15 and 16. The second terminal of current source 18 is connected to the junction between resistors 72 and 73, and the junction between resistor 72 and resistance element 15 is connected to ground.

The carrier gas is first directed through column 10 to purge any sample constituents therein which may have remained from a previous analysis. At this time, carrier gas flows past elements 15 and 16 at the same rate so that these elements are maintained at the same temperature. Thereafter, valve 14, which can be any known type of sample valve, is opened momentarily to introduce a predetermined volume of the sample to be analyzed into column 10. The individual constituents of the fluid sample travel through the column at varying rates which depend upon their affinities for the packing material. As these constituents appear sequentially in the column effluent, the thermal conductivity of the effluent is changed so that the temperature, and thus the resistance, of element 16 changes with respect to element 15. Elements 15, 16, 72, 73 and 17 form a Wheatstone bridge network which compares the thermal conductivities of the gases in conduits 11 and 12.

The contactor of potentiometer 17 is connected to the first end terminals of potentiometers 75 and 76, the second end terminals of which are connected to ground. The contactors of potentiometers 75 and 76 are connected to respective switches 77 and 79. Switches 77 and 79 engage respective terminals 78 and 80 when closed by a timer 70. Terminals 78 and 80 are connected to the first input terminal of an amplifier 20, the second input terminal of which is connected to ground. The contactor of potentiometer 17 is also connected to the first input terminal of amplifier 20 through a switch 83. The first output terminal of amplifier 20 is connected to a terminal 21 and to the cathode of a diode 22. The anode of diode 22 is connected to terminals 23 and 24 which are adapted to be engaged by respective switches 25 and 26. Switches 25 and 26 are connected to first terminals of respective capacitors 27 and 28, the second terminals of which are connected to ground. The first terminals of capacitors 27 and 28 are connected to respective switches 30 and 31 which are adapted to engage respective terminals 32 and 33. Terminals 32 and 33 are connected to the control grids of respective triodes 34 and 35. The anodes of triodes 34 and 35 are connected to a terminal 36 which is maintained at a positive potential. The cathodes of triodes 34 and 35 are connected to ground through respective resistors 37 and 38. The cathode of triode 34 is connected to the first end terminal of a potentiometer 39. The contactor of potentiometer 39 is connected to a terminal 42. The cathode of triode 35 is connected to a terminal 41.

Switches 25 and 26 are also connected to respective terminals 45 and 46 which are adapted to be engaged by respective switches 47 and 48. Switches 47 and 48 are connected to one another and to ground through a resistor 50. The second end terminal of potentiometer 39 is connected to the cathode of a triode 51. The anode of triode 51 is connected to terminal 36, and the cathode of triode 51 is connected to ground through a resistor 52. The control grid of triode 51 is connected to the anode of a diode 53. The cathode of diode 53 is connected to ground. A resistor 54 is connected in parallel with diode 53.

A switch 56 is adapted to engage terminals 42 and 21 selectively, and a switch 57 is adapted to engage terminals 41 and 58 selectively. Terminal 58 is connected to ground. Switches 56 and 57 are connected to the respective input terminals of a servo amplifier 60, which can be of the type shown in Electronic Control Handbook, Batcher and Moulic, Caldwell-Clements, Inc., New York (1946), page 298, for example. The output terminals of amplifier 60 are connected through switches 61 to a reversible motor 62 and through switches 63 to a reversible motor 64. The drive shaft of motor 62 is mechanically connected to the contactor of potentiometer 39, and the drive shaft of motor 64 is mechanically connected to the contactor of potentiometer 17. The drive shaft of motor 62 is also mechanically connected to the contactor of a telemetering potentiometer 65. A voltage source 66 is connected across the end terminals of potentiometer 65. The contactor of potentiometer 65 is connected to a first output terminal 67, the second output terminal 68 being grounded.

In order to describe the operation of the comparison circuit, the arm of potentiometer 39 above the contactor is designated as resistance $R_1$. The resistance of the arm of potentiometer 39 below the contactor is designated as resistance $R_2$. The arm of potentiometer 65 above the contactor is designated as resistance $R_3$, and the arm of potentiometer 65 below the contactor is designated as resistance $R_4$. The current flowing from the output of cathode follower 34 through resistances $R_1$ and $R_2$ to ground is designated $i_1$. The current flowing from the output of cathode follower 35 through the input of amplifier 60 and through resistance $R_2$ to ground is designated $i_2$. With reference to the drawing, the following equations become apparent:

$$E_1 = i_1(R_1 + R_2) + i_2 R_2$$

$$E_2 = i_1 R_2 + i_2 R_2$$

The ratio can be expressed:

$$\frac{E_1}{E_2} = \frac{i_1(R_1 + R_2) + i_2 R_2}{i_1 R_2 + i_2 R_2}$$

At null, $i_2 = 0$, so that:

$$\frac{E_1}{E_2} = \frac{i_1(R_1 + R_2)}{i_1 R_2} = \frac{R_1 + R_2}{R_2} = \frac{k'(R_3 + R_4)}{R_4} = \frac{k' E_3}{E_4}$$

where $k'$ is a constant maintained by the mechanical linkage between the contactors of potentiometers 39 and 65. This can be expressed:

$$E_4 = \frac{k' \cdot E_2 \cdot E_3}{E_1} = \frac{k E_2}{E_1}$$

where $k$ is a constant determined by $k'$ and voltage source 66.

The output voltage $E_4$ which appears between terminals 67 and 68 is thus representative of the ratio of the output signals from cathode followers 34 and 35.

All of the switches of this circuit are operated by means of a timer 70 in the sequence hereinafter described. This timer can be any conventional instrument which establishes a series of control signals in a desired sequence. Timer 70 also controls the opening of sample valve 14. As previously mentioned, the individual constituents of the sample mixture appear in the effluent from column 10 in sequence. The output signals from the bridge network represent the concentrations of these individual constituents in the fluid mixture sample. Prior to the introduction of sample into the column, the bridge circuit is adjusted to secure a balanced condition. This is accomplished by moving switches 56 and 57 to engage respective terminals 21 and 58. Switches 63 and 83 are closed at this time and switches 61 are open. The output signal from the bridge network is thus applied directly from amplifier 20 through servo amplifier 60 to energize motor 64. The contactor of potentiometer 17 is adjusted by motor 64 to whatever extent is required to balance the bridge network until the output signal is zero. Switches 63 and 83 are then opened by timer 70 so that no further adjustment of potentiometer 17 is made during the analysis cycle.

Timer 70 closes switches 77 and 25 during the time that the first constituent of the fluid sample to be measured appears in the effluent from column 10. Potentiometer 75 serves to attenuate this signal by any desired amount. The output signal from the bridge network is stored on capacitor 27. Switch 30 is open at this time. Switches 77 and 25 are then opened, after the first selected sample constituent is eluted past element 16. Switches 79 and 26 are closed at a later time when the second selected constituent appears in the effluent from column 10. A corresponding signal representing the peak amplitude of the second constituent is stored on capacitor 28, switch 31 being open at this time. Switches 47 and 48 are open during the times the signals are stored on capacitors 27 and 28. After the two signals are stored on the capacitors, switches 30 and 31 are closed in unison so that the signals stored on respective capacitors 27 and 28 are transmitted through respective cathode followers 34 and 35. Switches 56 and 57 engage respective terminals 42 and 41 at this time. Switches 61 are closed so that the output signal from amplifier 60 energizes motor 62 to adjust the contactors of potentiometers 39 and 65. The contactor of potentiometer 39 is adjusted until the network is balanced and an output signal is established at the contactor of potentiometer 65 which is representative of the ratio of the signals stored on respective capacitors 27 and 28. Thereafter, switches 47 and 48 are closed to discharge capacitors 27 and 28 through resistor 50. This prepares the analyzer for a subsequent analysis. Diode 53, resistor 54 and triode 51 apply a bias potential to the second end terminal of potentiometer 39. This compensates for the contact potential of diode 22.

From the foregoing description it can be seen that improved analysis apparatus is provided which establishes a signal that is representative of the ratio of two constituents of a fluid mixture to be analyzed. While the invention has been described in conjunction with a present preferred embodiment, it should be evident that it is not limited thereto.

What is claimed is:

1. Analysis apparatus comprising
   (a) analyzer means adapted to analyze at least a first and a second constituent of a stream of material and to generate respectively at least a first and a second electrical signal as each of said first and said second constituents is sensed by said analyzer respectively during successive intervals of time, said signals being present on an output terminal of said analyzer means,
   (b) a rectifier having one terminal thereof connected to the said output of said analyzer means, said rectifier being adapted to pass signals in a direction from said analyzer means to switching means detailed hereafter,
   (c) first and second electrical signal storage means,
   (d) first switching means adapted to connect the second terminal of said rectifier to said first storage means,
   (e) second switching means connecting the second terminal of said rectifier to said second storage means,
   (f) signal comparing means,
   (g) third switching means to simultaneously connect said first and second storage means to said signal comparing means, (h) means responsive to said signal comparing means to establish a final output signal representative of the ratio of the signals stored on said first and second storage means, and (i) timing means operatively connected to said analyzer means and with each of said switching means whereby said first switching means will be closed during generation of said first electric signal and opened after said first signal has been generated, and whereby at a subsequent time said second switching means will be closed during generation of said second electrical signal and opened after said second signal has been generated, and whereby said third switching means will be closed at a subsequent period of time and opened after said first and said second signals have been compared in said signal comparing means.

2. The apparatus of claim 1 wherein said analyzer means comprises a chromatographic analyzer.

3. The apparatus of claim 1 wherein the said signal comparing means and said means to establish a second output signal comprise a potentiometer, means to connect said potentiometer across said first storage means, a reversible motor having the drive shaft thereof connected to the contactor of said potentiometer, said signal comparing means connected between the contactor of said potentiometer and said second storage means, and means responsive to said comparing means to actuate said motor.

References Cited in the file of this patent

UNITED STATES PATENTS

| | | |
|---|---|---|
| 2,617,586 | Gray | Nov. 11, 1952 |
| 2,712,128 | Woodruff | June 28, 1955 |
| 2,823,351 | Page | Feb. 11, 1958 |
| 2,869,853 | Pratt | Jan. 20, 1959 |
| 2,875,606 | Robinson | Mar. 3, 1959 |
| 2,896,165 | Hornig et al. | July 21, 1959 |
| 3,002,818 | Berger | Oct. 3, 1961 |

FOREIGN PATENTS

| | | |
|---|---|---|
| 880,182 | France | Dec. 18, 1942 |

OTHER REFERENCES

Gas Chromatography, Book by V. J. Coates et al.; published by Academic Press Inc., New York, in 1958; pp. 261–263 relied on. (Copy in Patent Office Scientific Library and Div. 36.)